(12) United States Patent
McGrew et al.

(10) Patent No.: US 8,503,681 B1
(45) Date of Patent: Aug. 6, 2013

(54) METHOD AND SYSTEM TO SECURELY TRANSPORT DATA ENCRYPTION KEYS

(75) Inventors: David McGrew, Poolesville, MD (US); Flemming Stig Andreason, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 11/463,254

(22) Filed: Aug. 8, 2006

Related U.S. Application Data

(60) Provisional application No. 60/733,370, filed on Nov. 4, 2005.

(51) Int. Cl.
*H04L 29/06* (2006.01)

(52) U.S. Cl.
USPC ............ 380/281; 380/277; 380/286; 713/171

(58) Field of Classification Search
USPC ........................... 713/171; 380/277, 281, 286
See application file for complete search history.

(56) References Cited

U.S. PATENT DOCUMENTS

| | | | |
|---|---|---|---|
| 5,081,678 A | | 1/1992 | Kaufman et al. |
| 6,795,555 B1 * | | 9/2004 | Parisien et al. .................. 380/47 |
| 2004/0146164 A1 * | | 7/2004 | Jonas et al. .................... 380/284 |
| 2004/0158704 A1 * | | 8/2004 | Oates et al. .................... 713/151 |
| 2006/0062393 A1 * | | 3/2006 | Hsu et al. ....................... 380/281 |

OTHER PUBLICATIONS

Communications protocol. In Microsoft Computer Dictionary. Microsoft Press 2002.*

Schneier, Bruce. Applied Cryptography: Protocols, Algorithms, and Source Code in C. 2nd. New York: John Wiley & Sons, Inc., 1996. Print.*

J. Black, Authenticated encryption (pp. 1-4). Aug. 19, 2004.*

Andreasen, F., et al., "Session Description Protocol Security Descriptions for Media Streams <draft-ietf-mmusic-sdescriptions-12.txt>", *MMUSIC Working Group, Internet-Draft*, (Sep. 2005), 37 pgs.

Arkko, J., et al., "MIKEY: Multimedia Internet KEYing", *Networking Working Group, Request for Comments*: 3830, (Aug. 2004), 63 pgs.

Baugher, M., et al., "The Secure Real-Time Transport Protocol (SRTP)", *Network Working Group, Request for Comments*: 3711, (Mar. 2004), 54 pgs.

Bradner, S., "Key Words for Use in RFCs to Indicate Requirement Levels", *Network Working Group, Request for Comments*: 2119, (Mar. 2007), 3 pgs.

Liskov, M., et al., "Tweakable Block Ciphers", *Proceedings of the 22nd Annual International Cryptology Conference on Advances in Cryptology*, vol. 2442, (Aug. 2002), 31-46.

* cited by examiner

*Primary Examiner* — William S. Powers
*Assistant Examiner* — Imhotep Durham
(74) *Attorney, Agent, or Firm* — Schwegman, Lundberg & Woessner, P.A.

(57) ABSTRACT

A method and system to transport encrypted keys among the participants of a real time communications session are provided. The system may include a message detector, a carrier packet detector and a decrypting module. The message detector may be configured to receive, at a target device, a first communication from a source device. The first communication may comprise a first message. The carrier packet detector may be configured to receive, at a target device, a second communication from a source device. The second communication may comprise a first encrypted key to decode the first message. The decrypting module may be configured to decode the message, utilizing the first encrypted key.

37 Claims, 9 Drawing Sheets

METHOD AND SYSTEM TO SECURELY TRANSPORT DATA ENCRYPTION KEYS

CROSS-REFERENCE TO RELATED APPLICATIONS

This application claims the benefit of U.S. Provisional Application No. 60/733,370, filed on Nov. 4, 2005, under 35 U.S.C. §119(e), which is hereby incorporated by reference.

FIELD

This application relates to a method and system to securely transport data encryption keys.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Real-time Transport Protocol (RTP) and Real-time Transport Control Protocol (RTCP) have been designed to allow decentralized groups with minimal control to establish sessions, e.g. for multimedia conferences. A security profile for RTP (SRTP) and a security profile for RTCP (SRTCP) add confidentiality, message authentication, and replay protection to RTP. SRTP and SRTCP sessions typically require that synchronization source ID (SSRC) values and other data be coordinated among all of the participants in a real-time communications session. Therefore, SRTP and SRTCP sessions are typically not used in minimal-control scenarios. For example, if a new participant joins a real-time communications session that is already in progress, the new participant needs to obtain a sender's SRTP rollover counter (ROC) and the sender's encryption and authentication keys in order to process media messages form the sender.

A real-time communications session utilizing SRTP may require a central control mechanism, e.g., a dedicated server to poll each session participant in order to obtain and store the participants' keys, the participants' rollover counters, as well as other necessary information in a centralized manner. In some systems, RTP and RTCP may be used in conjunction with a signaling system that may be configured to provide some but not all of the coordination functionality required by SRTP.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

Figure 1:
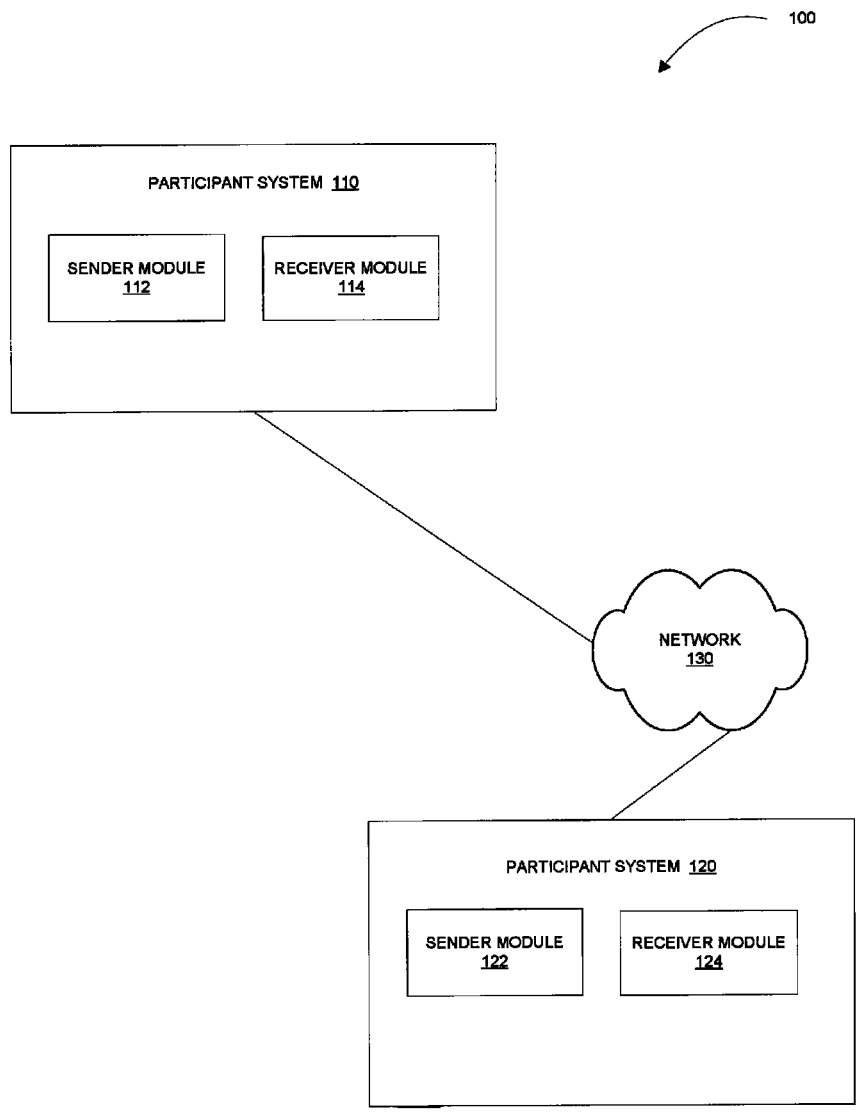
FIG. 1 shows a network environment within which an example embodiment may be implemented.

Embodiments of the invention may be adapted to address problems that may occur when SRTP or Internet Protocol Security (IPSec) is used in group situations. Example group situations may include conferences, call-monitoring situations, call-recording situations, and situations in which multiple devices respond to a single invitation (e.g. both a telephone and an answering machine answering a telephone call).

Some embodiments of the invention address group key management issues. For example, where a set of devices share a key encrypting key to transport data-protection keys to each other, a data protection key from a sender of a media message may be provided to a recipient of the media message at the point in time when the recipient needs the sender's data protection key in order to process the media message. The sender's data protection key may be stored by the recipient to process subsequent messages from the same sender. Alternatively, the recipient may discard the key from the sender after the message is processed and then obtain the key again, when a new message from the sender arrives.

The system to address group key management issues may be configured such that the group key management is performed without adding an external key management protocol, and at the same time controlling possible bandwidth overhead. In an example embodiment, a method and a system to provide sender's SRTP master key, rollover counter and initial sequence number (ISN) to all of the participants of an SRTP conference may also allow the participants to determine which crypto-suite is in use by the sender.

Some embodiments of the invention provide methods for transporting keys for use in an authenticated encryption algorithm. For example, a base security protocol that provides authenticated encryption, such as IPSec or SRTP, may be used, and a member of a group may be permitted to generate a data protection key and transport this key to the other group members. The data protection key may be encrypted using a key encrypting key and the encrypted data protection key (e.g., the resulting ciphertext) may be included in one or more of the packets from the base protocol (e.g., in one or more SRTP or IPSec packets). Because the implicit authentication (e.g., base protocol verification) is used to verify the correctness of the transported keys, the receiver can store the transported keys, which allows the receiver to process and accept packets that are protected with those keys but which do not contain any EKT data (e.g. the encrypted data protection key).

The EKT data added to a packet may increase the size of the packet. In order to avoid the packet size increase, in some example embodiments, the EKT data is not included in each packet. Some protocols can be subdivided into a 'control' protocol to control an associated session and a 'data' protocol to accommodate communication of data. For example, SRTCP is the control protocol for SRTP. EKT can be carried by a control protocol, but not by the corresponding data protocol. Nonetheless, the keys provided via the control protocol may be used for both the control and data protocols.

The control protocol may be a separate protocol that is associated with the data protocol. For example, with Interactive Connectivity Establishment (ICE), STUN messages between peers may be used to convey EKT data for the associated data protocol. STUN stands for a simple traversal of user datagram protocol through network address translation. Furthermore, where multiple concurrent sessions of a protocol are utilized, it may be possible to have the EKT data carried by one of the sessions, while the other sessions make use of the keys transported by EKT to decrypt the other sessions. For the purposes of this description, the phrase "carrier packet" is used to mean a packet that explicitly contains an encrypted data protection key. Other packets that are not carrier packets may make use of a data protection key that is conveyed by a carrier packet. RTP and SRTP include the notion of sender and receiver reports, both of which can be used as carrier packets. The encrypted key in the sender report may be implicitly authenticated by the recipient of the sender report, where the recipient accepts the key only if the authentication check of the base protocol has passed. It will be noted, that in some example embodiments, a protocol other than SRTCP, e.g., STUN using ICE, may be utilized to transport EKT.

As such, a method is provided for securely transporting data-protection keys encrypted by a key encrypting key, among a plurality of devices participating in a real-time communications session. The transporting of the data-protection keys may be accomplished by a system where a sender device generates an encrypted data-protection key and periodically sends it out for access by the receiver devices. The receiver devices may be configured to rely on the authentication check of the base protocol in order to verify the authenticity of the encrypted data-protection key. The method and system to transport data-encryption keys may be referred to as an Encrypted Key Transport (EKT) with implicit authentication, which is discussed in greater detail below. EKT may be implemented as an extension to SRTP to provide for the secure transport of SRTP master keys, rollover counters, initial ISNs, and other information, within SRTCP. It will be noted, that although the example embodiments are described herein in the context of SRTP, the techniques for secure transport of the data-protection keys may be utilized with other base security protocols.

An example embodiment of an Encrypted Key Transport system may be implemented in the context of a network environment. An example of such a network is illustrated in FIG. 1.

FIG. 1 illustrates a network environment 100. The environment 100, in an example embodiment, includes a plurality of computer systems (representative of any endpoints) that may participate in a real-time communications session. In the network environment 100, an example participant system 110 and an example participant system 120 are coupled to a communications network 130. The communications network 130 may be a public network (e.g., the Internet, a wireless network, etc.) or a private network (e.g., LAN, WAN, Intranet, etc.).

In an example embodiment, each of the systems 110 and 120 has respective sender modules 112 and 122, and respective receiver modules 114 and 124. The system 110 may receive communications from the system 120 and vise versa utilizing the respective sender and receiver modules. An example receiver module is illustrated in FIG. 2.

Figure 2:
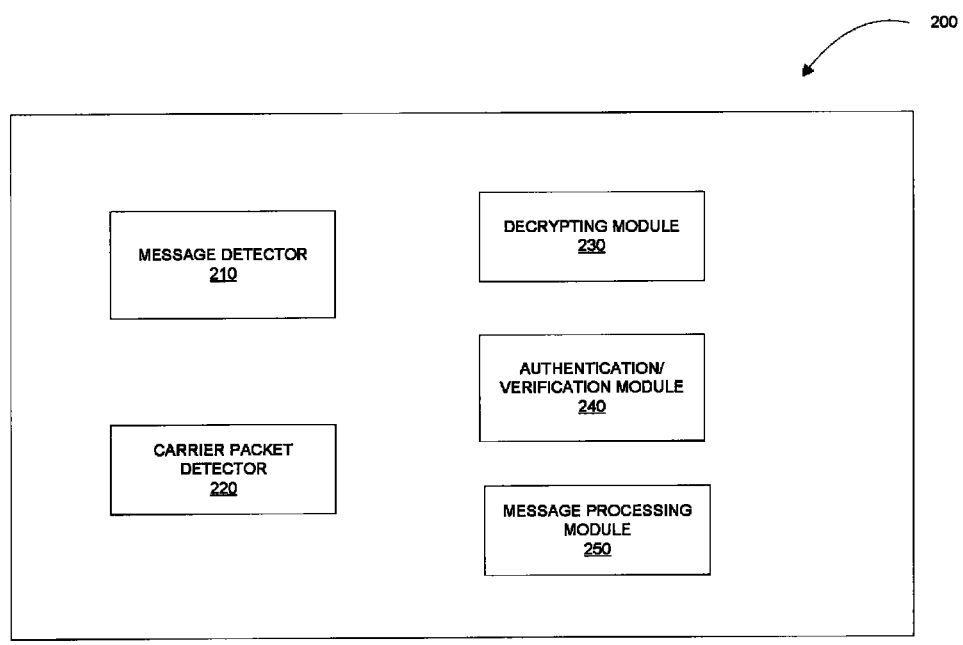
FIG. 2 shows a receiver hosted by a real-time communications participant, in accordance with an example embodiment.

Referring to FIG. 2, a receiver module 200, in an example embodiment, comprises a media message detector 210, a carrier packet detector 220, a decrypting module 230, an authentication/verification module 240 and a message processing module 250. The example operations performed by the receiver 200 may be described with reference to FIG. 3.

Figure 3:
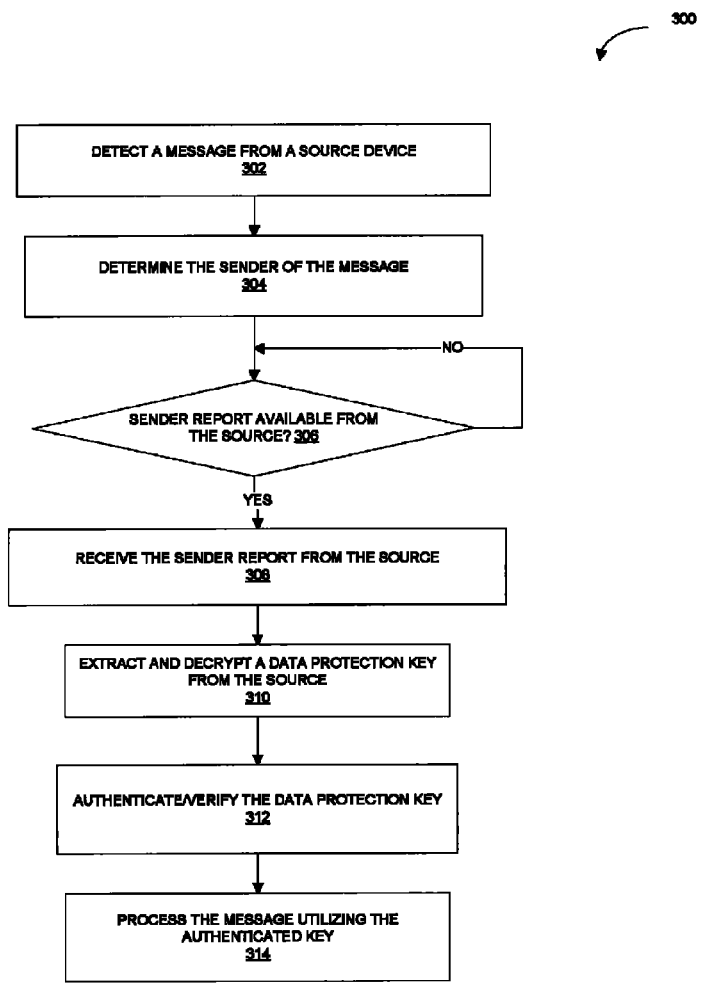
FIG. 3 is a flow chart of a method to obtain an encrypted key in the context of an SRTP session, in accordance with an example embodiment.

FIG. 3 is a flow chart of a method 300 to obtain an encrypted key in the context of an SRTP session, according to an example embodiment. The method 300 may be performed by processing logic that may comprise hardware (e.g., dedicated logic, programmable logic, microcode, etc.), software (such as run on a general purpose computer system or a dedicated machine), or a combination of both. In an example embodiment, processing logic comprises the receiver 200 of FIG. 2 hosted on a target device (e.g., the participant system 120 of FIG. 1). In an example embodiment, the processing logic may reside at the participant system 110 of FIG. 1.

As shown in FIG. 3, the method 300 commences at operation 302. At operation 302, the media message detector 210 detects a media message from a source device (e.g., from the participant system 120 of FIG. 1). As mentioned above, in order to process the detected media message, the receiver 200 may need to obtain the sender's data protection key.

At operation 304, the receiver 200 determines the sender of the detected media message and the carrier packet detector 220 starts monitoring for the sender's report from the determined sender (operation 306). Once the sender's report becomes available, the receiver 200 receives the report at operation 308. At operation 310, the decrypting module 230 first extracts and decrypts the data protection key from the sender's report (included in the sender's SRTCP packet) and starts utilizing the decrypted data protection key as a provisional key to process the SRTCP packet. As shown at operation 312, the authentication/verification module 240 implicitly authenticates the extracted key and, if the authentication is successful, starts utilizing the extracted key as a master key. This authenticated master key may be used by the message processing module 250 to process media messages from the sender (operation 314). Further example detail regarding the operations performed by the authentication/verification module 240 is described below with reference to FIG. 7.

The sender's report that may be used to transport encrypted data protection keys, may be generated by a sender module 122 of a participant system of FIG. 1. An example sender module 400 is illustrated in FIG. 4.

Figure 4:
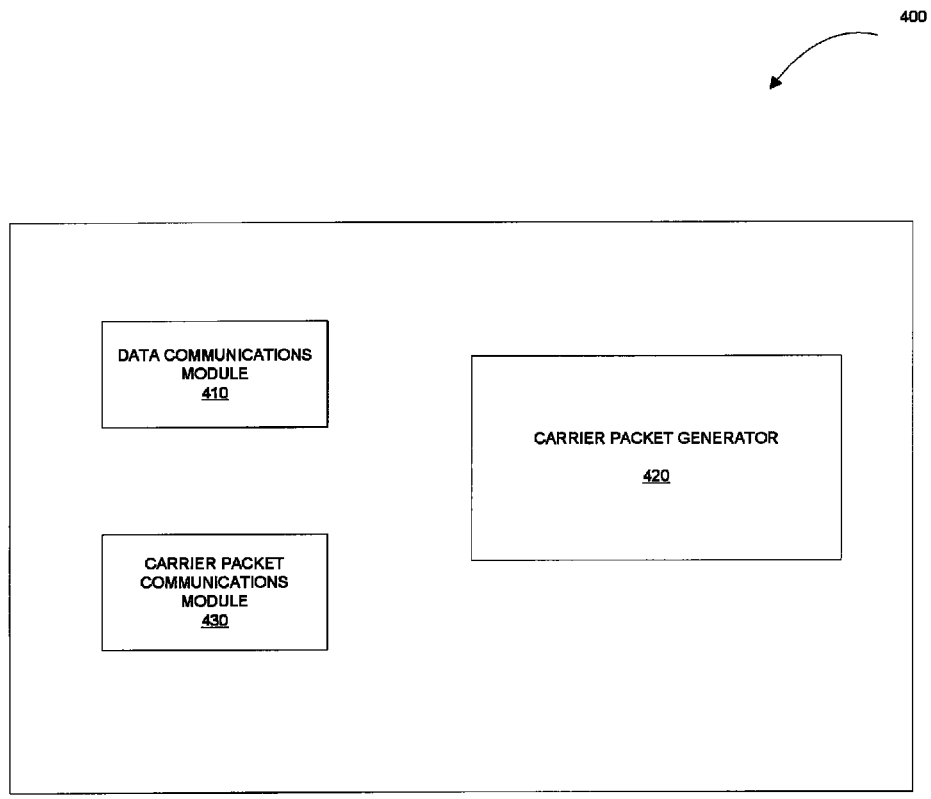
FIG. 4 shows a sender hosted by a real-time communications participant, in accordance with an example embodiment.

Referring to FIG. 4, the sender 400, in an example embodiment, comprises a data communications module 410, a carrier packet communications module 430 and a carrier packet generator 420. The data communications module 410 may be configured to communicate media messages to recipients, the carrier packet generator 420 may be configured to generate a carrier packet to include the sender's information that may be necessary for recipients to process the media messages, and the carrier packet communications module 430 may be configured to communicate the sender's report to the recipients of the media messages from the sender. Because a sender's report generated by the carrier packet generator 420 may include an encrypted data protection key, the sender 400 may be utilized to provide encrypted data protection keys to the participants of an SRTP session.

In an example embodiment, all traffic in an SRTP stream is identified by a particular SSRC and SRTP master keys are associated with SRTP streams. An SRTP master key may be encrypted with a key encrypting key, and the resulting ciphertext may be transported in SRTCP packets (e.g., every SRTCP packet) in the corresponding SRTP/SRTCP stream. Since the SRTCP protocol periodically sends sender or receiver reports in SRTCP packets, this example embodiment uses those packets as a transport, and also provides the sender's SRTP master key to the endpoints. A single EKT key encrypting key may be utilized to protect all of the SRTP streams (including SRTCP) within an SRTP session. Alternatively, multiple session keys may be used within a particular session.

In order to provide transport of the encrypted key between the participants of an SRTP session, the carrier packet generator 420 may be configured to add a rollover counter field, an encrypted SRTP master key field, an ISN field and a security parameter index (SPI) field to the SRTCP trailer. Some of the fields included in an example SRTP packet utilized by EKT are illustrated in FIG. 5.

Figure 5:
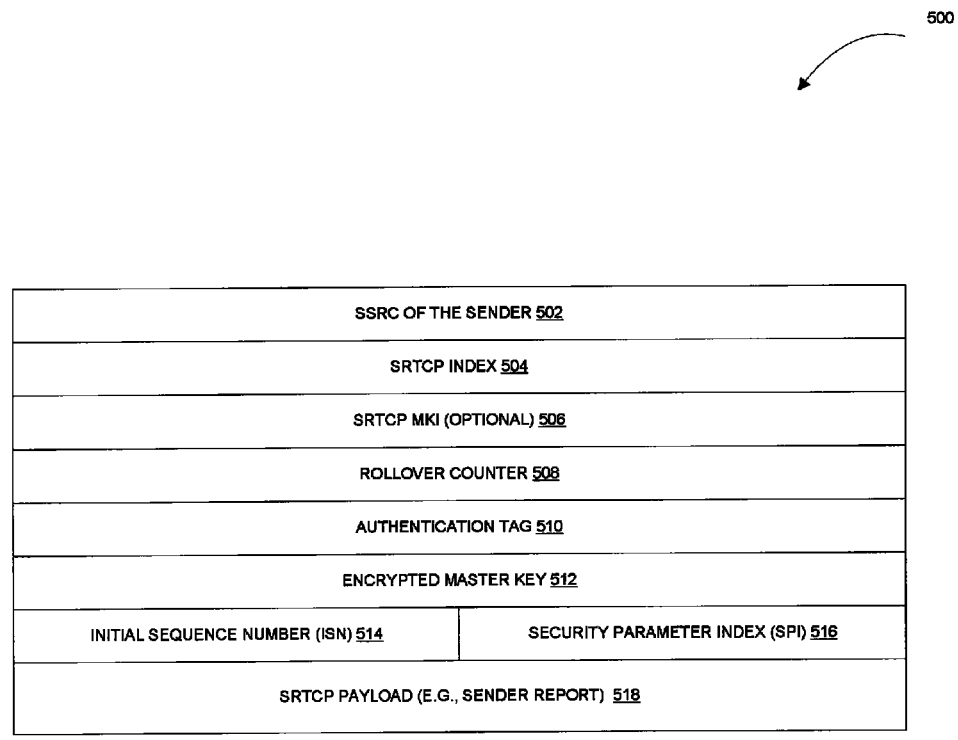
FIG. 5 shows example fields in an SRTP packet utilized by EKT, in accordance with an example embodiment.

Referring to FIG. 5, the SRTP packet 500 may include an SSRC of the sender 502, an SRTP index 504, an optional SRTCP master key identifier (MKI) 506, a rollover counter 508, an authentication tag 510, an encrypted master key 512, an initial sequence number (ISN) 514, a security parameter index (SPI) 516 and an SRTP payload (e.g., a sender report) 518.

The rollover counter 508 may be set to the current value of the SRTP rollover counter in the SRTP context associated with the SSRC in the packet. This field is included in the authenticated portion of the SRTCP packet and may be authenticated, e.g., at the receiver 200 of FIG. 2, by the normal SRTCP authentication.

The encrypted master key 512, in an example embodiment, may include the ciphertext value resulting from the encryption of the SRTP master key corresponding to the SSRC of the sender contained in the packet. The encryption and decryption of the SRTP master key may be performed using a cipher as described in detail below. The master key 512 may be encrypted under a long-term key encrypting key (KEK). The KEK may be shared by all participants in the SRTP session, and, in an example embodiment, is used only to encrypt and decrypt the master keys. The encryption may be performed, e.g., using Advanced Encryption Standard (AES) in Electronic Code Book (ECB) mode, an AES Key Wrap Cipher, and other encryption standards. The master key 512 may be authenticated, e.g., by the authentication/verification module 240 of FIG. 2, utilizing the normal SRTCP authentication.

The security parameter index (SPI) 516 may have a fixed length and may be included as the last field in the packet, such that this field may be unambiguously parsed. Additionally, an SPI may indicate the KEK in use and the particular crypto policy or crypto-suite.

In an example embodiment, Encrypted Key Transport (EKT) may be implemented as an extension to SRTP to provide for the secure transport of SRTP master keys, rollover counters, ISNs and other information, within SRTCP. In order to provide both confidentiality and authentication to a data flow, some embodiments of the method and system described herein may use an authenticated encryption (AE) operation.

In an example embodiment, where an AE operation is utilized, a key encrypting key is used to encrypt a lower-level key that is used to protect the data flow. The key encrypting key is used to encrypt the data protection key, and the ciphertext form of the latter key is sent along with the data flow. This is referred to herein as Authenticated Encryption with Key Transport (AEKT). To increase efficiency, the idea of implicit authentication may be implemented in which the ciphertext form of the data protection key is not directly authenticated by the key encrypting key. Instead, the authentication method used in the base protocol's data protection may be leveraged to also provide the authentication check on the encrypted data protection key.

While the methods described herein were developed for use as an extension to Secure RTP, these methods are described separately in order to present it in a way that may be useful in other protocols, as well as to provide a discussion of its security properties.

Authenticated encryption (AE) is a process of enciphering data such as to provide a way to check the authenticity and integrity of the plaintext data, in addition to providing the confidentiality of that data. Additionally, an AE transform may also provide for the authentication of associated data. In an example embodiment, the associated data is not encrypted, but is available at the time of decryption.

An AE transform, in an example embodiment, comprises an authenticated Encryption Operation (E0) and an authenticated Decryption Operation (D0). The operation E0 maps a secret key K, a plaintext P, and an associated data value A to a ciphertext C and an authentication tag T. The operation D0 takes as input a secret key K, a ciphertext C, associated data A, and a tag T. The operation D0 returns either a plaintext P, or a special symbol FAIL, which denotes that the values of A, C, and T are not authentic, in other words, that the values of A, C, and T were not created using the operation E0 with the same key. Whenever the inputs A, C, and T to D0 are created using E0, the decryption operation never returns FAIL. Because of the limitations of most of the available computational resources it may be prohibitively difficult to forge A, C, and T values. In mathematical notation:

E0(K, A, P)->C, T
D0(K, A, C, T)->P or FAIL

An Authenticated Encryption with Key Transport (AEKT) method, in an example embodiment where the encryption function produces the encrypted key Z, can be defined as follows:

E1(K, A, P)->C, T, Z
D1(K, A, C, T, Z)->P or FAIL

An AEKT method may be built utilizing an AE method and a cipher. Below, the cipher's encryption function is denoted as e, and its decryption function is denoted as d. The encryption function e may be the Advanced Encryption Standard (AES) in the Electronic Codebook (ECB) mode of operation. The decryption function d may be the ECB decryption function. The convention of denoting an authenticated encryption operation with a capital letter (e.g. E0, E1) is used, and denoting conventional encryption with a lowercase letter is used. Encryption operation E1 may be described as follows.

1. The first time that the function is invoked, choose a key R uniformly at random.
2. Compute the value Z=e(K, R) using the cipher e.
3. Compute the ciphertext C and the tag T using E0, by using R as the master key in that function, using the plaintext input to E1 as the plaintext input to E0, and forming the associated data for E0 by concatenating Z with the associated data provided as input to E1. Mathematically, E0(R, (A||Z), P)->C, T.
4. Store the value R for use in future invocations of E0.
5. Return the values Z, C, and T computed above.

The decryption function D1 is given by D1(K, A, C, T, Z)=D0 (d(K, Z), A, C, T). If the operation D0 returns a FAIL, then the D1 operation returns a FAIL as well.

The value d(K, Z) may be stored between decryption operations as an optimization. In an example embodiment, the value d(K, Z) is stored only if the D0 operation does not return FAIL. This optimization may be useful whenever the cost of 'key scheduling' for the D0 operation is relatively expensive. (For example, the D0 operation may derive secondary keys, or it may compute key-dependent tables; these operations may contribute significantly to the computational cost of D1.)

In some cases, it may be desirable to let the sender choose different values of the key R that is used in E0. In order to achieve enhanced security, the key R may be changed periodically. When the value of the key R is changed by the sender, the change will be apparent to the receiver because the value of the encrypted key Z will be changed. Thus, a receiver that caches the value of R=d(K, Z) can detect when it needs to re-compute the value of R by comparing a cached value of Z to the value provided by the sender.

The AEKT method defined above, in an example embodiment, creates only a single ciphertext using the key encrypting key for each data-protection key (R). This method may thus alleviate issues associated with overuse of the key encrypting key, which may be a significant security benefit.

The methods described herein may be used to enhance the robustness of the secure RTP, to reinstate decentralized control, to eliminate signaling/RTP layer violations and to reduce motivations to cheat in implementations in ways that could impact security.

More detailed implementations of the EKT is described below for an extension to SRTP that fits within the SRTP framework and reduces the amount of control that is needed in an SRTP session. In an example embodiment, the EKT securely distributes the SRTP master key and other information for each SRTP stream using SRTCP. With this method, SRTP entities are free to choose SSRC values as they see fit, and to start up new SRTP streams without coordinating with other entities via signaling or other external means. Thus, because there is no need to control SSRC values closely, the RTP collision detection and repair mechanism may be utilized in SRTP.

An SRTP endpoint using EKT can generate new SRTP master keys whenever an old key has been overused, or start up a new SRTP stream to replace an old SRTP stream that has reached the packet-count limit. EKT may also be utilized to address the problem in which the burst loss of the N initial SRTP packets can confuse an SRTP receiver, when the initial RTP sequence number (ISN) is greater than or equal to $2^{16}-N$. If the ISN is nonzero, then it indicates the RTP sequence number of the initial RTP packet that is protected using the SRTP master key that is also conveyed by the packet. Conveying the ISN, furthermore, may enable the EKT to precisely synchronize changes in SRTP master keys without resorting to trial-and-error between the old and new keys. In an example embodiment, the RTP sequence number and, consequently, the ISN is 16 bits, which may result in a reduced packet overhead. Therefore, the ISN may be set to zero when the initial packet protected by this master key either precedes or is concurrent with the last roll-over of the RTP sequence number. These features may simplify many architectures that implement SRTP.

EKT, in an example embodiment, provides a way for an SRTP session participant, either sender or receiver, to securely transport its SRTP master key, current SRTP rollover counter and the ISN to the other participants in the session. Transporting the SRTP master key, current SRTP rollover counter and the ISN provides the information needed by the receiver to instantiate a SRTP/SRTCP receiver context.

EKT, in an example embodiment, does not control the manner in which the SSRC and the master key are generated; it is concerned only with their secure transport. The SSRC and the master key may be generated on demand by the SRTP endpoint, or they may be dictated by an external mechanism such as a signaling agent or a secure group controller.

In an example embodiment, the cipher, the authentication function, or any other SRTP or SRTCP parameters may be established by out-of-band means, e.g., using a signaling method like SDP Security Descriptions [SDES] or MIKEY [RFC3830]. EKT may be utilized to relieve these methods of the burden of coordinating every SRTP stream among every SRTP participant.

EKT uses a cipher to encrypt the master keys. First the interface to the cipher is specified, in order to abstract the interface away from the details of the function. The cipher that is used in EKT by default is defined. This cipher must be implemented, but another cipher that conforms to this interface may be used, in which case its use must be coordinated by external means.

An EKT cipher, in an example embodiment, comprises an encryption function and a decryption function. The encryption function E(K, P) takes the following inputs:
 a secret key K with a length of L bytes, and
 a plaintext value P with a length of M bytes.

The encryption function returns a ciphertext value C whose length is N bytes, where N is at least M. The decryption function D(K, C) takes the following inputs:
 a secret key K with a length of L bytes, and
 a ciphertext value C with a length of N bytes.

The decryption function returns a plaintext value P that is M bytes long. These functions have the property that D(K, E(K, P))=P for all values of K and P. Each cipher also has a limit on the number of times T that it can be used with any fixed key value. For each key, the encryption function must not be invoked on more than the T number of values of P, and the decryption function must not be invoked on more than the T number of distinct values of C.

An EKT cipher, in an example embodiment, may have the following properties. The plaintext length M must match the length of the SRTP master key. The cipher is capable of resisting attacks that adaptively choose both ciphertexts and plaintexts. For each randomly chosen key, the encryption and decryption functions are indistinguishable from a random permutation and its inverse without non-negligible advantage. The encryption and decryption functions are indistinguishable from a random permutation and its inverse even for adversaries that can query both the encryption and decryption functions adaptively. An advantage may be understood as the difference between the probability that the adversary will identify the cipher as such and the probability that the adversary will identify the random permutation as the cipher, when each case is equally likely.

In an example embodiment, the Advanced Encryption Standard (AES) with 128-bit keys, in Electronic Codebook (ECB) Mode may be used as a default cipher. Its parameters may be fixed at L=16, M=16, and $T=2^{48}$. Note that M matches the size of the SRTP master keys used by the default SRTP key derivation function.

Returning to the method to transport encrypted key between the participants of a secure RTP session, EKT may incorporate a conventional SRTCP authentication function, which may be referred to as the base authentication function. The following describes an SRTCP authentication method and describes how an EKT authentication method may be built on top of the base method.

An SRTCP authentication method, in an example embodiment, comprises a tag-generation function and verification function. The tag-generation function, in an example embodiment, may be hosted by the sender module 400 and may take as input a secret key, the data to be authenticated, and the SRTCP packet index. The tag-generation function may provide an authentication tag as its sole output, which may then be used in the processing of outbound packets. The verification function, in an example embodiment, may be hosted by the receiver module 200 and may take as input a secret key, the data to be authenticated, the SRTCP packet index, and the authentication tag. The verification function returns an indication of whether or not the data, index, and tag are valid or not. The verification function may be used in the processing of inbound packets. EKT, in an example embodiment, defines a tag-generation function in terms of the base protocol tag-generation function, and defines a verification function in terms of the base protocol verification function.

Figure 6:
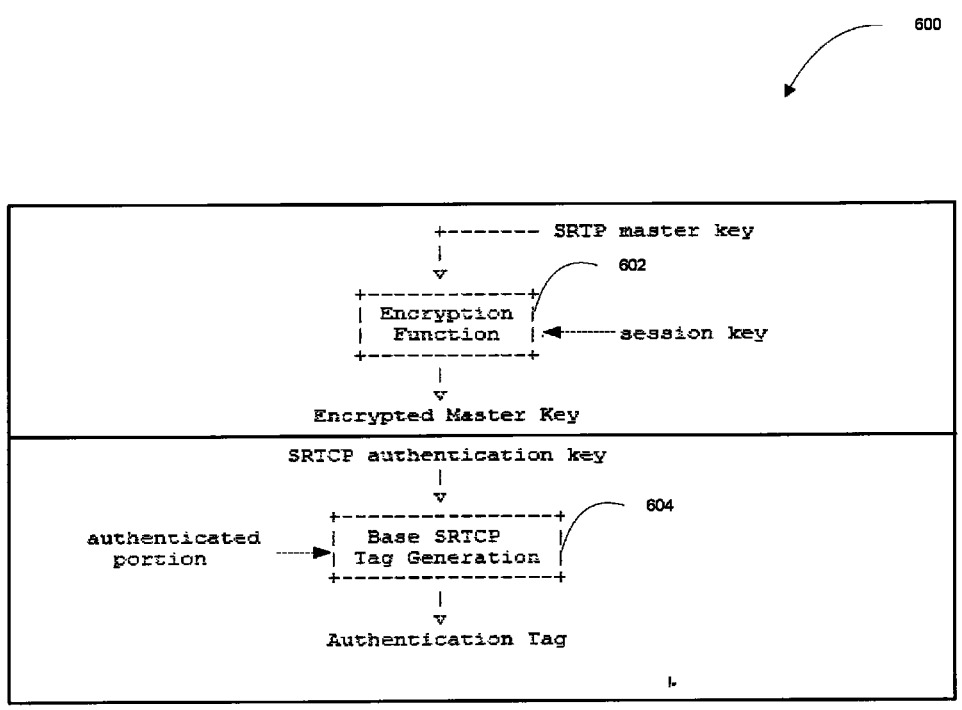
FIG. 6 illustrates a tag generation function for a given RTCP packet, in accordance with an example embodiment.

The tag generation function for a given RTCP packet is described by way of example with reference to FIG. 6. Referring to EKT outbound processing 600, as shown in FIG. 6, first, the rollover counter (field 508 of FIG. 5) is set to the current value of the SRTP rollover counter and the security parameter index (field 516 of FIG. 5) is set to the security parameter index. If only one key is provided for the session, then the all-null identifier may be used. The initial sequence number field is set to zero, if the initial RTP packet protected using the current SRTP master key for this source preceded, or was concurrent with, the last roll-over of the RTP sequence number. Otherwise, that field is set to the value of the RTP sequence number of the initial RTP packet that was or will be protected by that key. The authentication tag (field 510 of FIG. 5) may be computed using a base tag-generation function 602. In this computation, the rollover counter field and ISN are included in the authenticated portion of the SRTCP packet, as shown in FIG. 5. Then the encrypted master key field (field 512 of FIG. 5) is computed using the EKT cipher's encryption function 604. The SRTP master key corresponding to the SSRC (and MKI, if present) is the plaintext, and the key encrypting key is used as its key.

Figure 7:
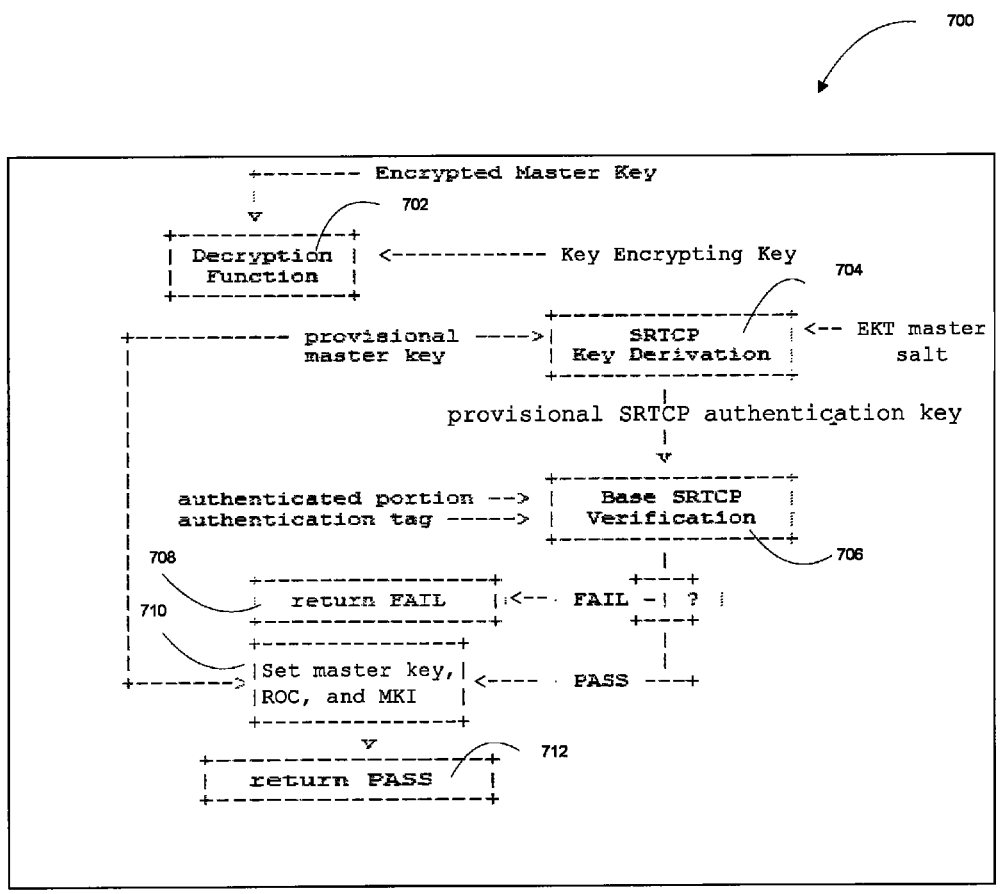
FIG. 7 illustrates an example EKT verification function, in accordance with an example embodiment.

An example EKT verification function is described with reference to FIG. 7. The SSRC field in the packet (field 502 of FIG. 5) is checked to see if it corresponds to a known SRTP stream with a known crypto context. If the SSRC field in the packet does not correspond to a known SRTP stream with a known crypto context, then the following steps are taken. First, the security parameter index (field 516 of FIG. 5) is checked to determine which session key should be used to process the packet. If there are multiple session keys, then the one whose identifier matches the field is used. If there is only a single session key, it should be used only if the field is set to the all-null value. Next, encrypted master key field (field 512 of FIG. 5) is decrypted (block 702) using the cipher's decryption function. The decrypted master key is used as the ciphertext, and the key encrypting key is used as the decryption key.

The plaintext resulting from the decryption is provisionally accepted as the SRTP master key corresponding to the SSRC is the packet. If an MKI is present, then the provisional key corresponds to the particular SSRC and MKI combination. If a non-zero ISN is present, then the initial sequence number for the provisional SRTP master key is set to the packet index created by appending that field to the current rollover counter and treating the result as a 48-bit unsigned integer—only packets with a corresponding or higher sequence number will use this provisional SRTP master key. A provisional key is used only to process one single packet. If that packet successfully passes its authentication check, then the provisional key is accepted as the master key corresponding to a particular source. Otherwise, the provisional key is be discarded, and does not affect any subsequent processing.

Returning to FIG. 7, the key derivation function (block 704) is run using the provisional key and the salting key associated with the session to derive an SRTCP authentication key. In data encryption, salt (or a salting key) is an initialization vector of a block cipher. The derived provisional SRTCP authentication key is provided to the base SRTCP verification function (block 706). The base SRTCP authentication function is evaluated using the authentication tag field and the authenticated portion of the SRTCP packet as inputs, and including the rollover counter and initial sequence number fields in the authenticated portion of the SRTCP packet (shown in FIG. 5). If that function returns an indication of authentication failure (block 708), then the packet is dropped and the receiver's state remains unchanged. If the verification function (block 706) indicates that authentication was successful, then the provisional SRTP master key is accepted and stored along with the SSRC value (and the MM value, if one is present, or the ISN and associated roll-over counter value, if one is present).

If the value of the rollover counter field (when considered as an unsigned integer in network byte order) is greater than the value of the SRTP rollover counter, then the rollover counter is set to the value of the field. The value of the encrypted master key field is stored along with its associated SSRC. The value of the encrypted master key may be referred to as the ciphertext form of the master key.

If the SSRC field in the SRTCP packet does correspond to a known SRTP stream with a known context, then the encrypted master key field is checked to determine if it matches the ciphertext form of the master key in that context. If a match is found, then that master key is used to process the packet. The base authentication function is used to check the authenticity of the packet, and if the check passes, then the SRTP rollover counter is checked against the rollover counter field as described above, and set if necessary.

If no match is found between the encrypted master key field and the ciphertext form of a master key, then the authentication check proceeds as if the stream context was unknown, as described above. If the authentication check passes, then the provisional master key replaces the master key in that context (block 710), subject to MKI or ISN value considerations when included. PASS value is returned at block 712.

Figure 8:
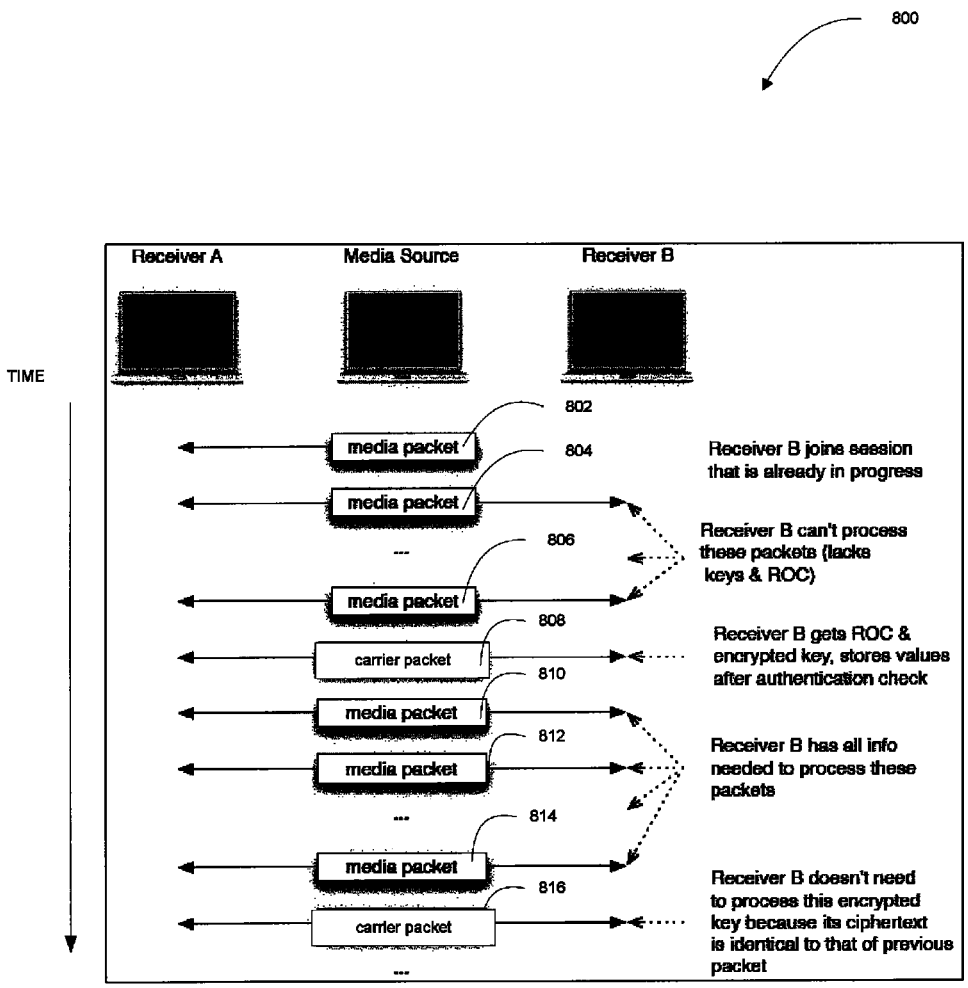
FIG. 8 illustrates a multimedia session, in accordance with an example embodiment.

An example of a multimedia session 800 is described with reference to FIG. 8. A media source initially provides a media packet including media data to a receiver A (block 802). At a subsequent time Receiver B joins the session in progress. Upon joining the session, Receiver B cannot process the media packets from the Media Source because it lacks keys and a source roll-over counter (ROC) (blocks 804 and 806). The media source periodically transmits a carrier packet, which includes a master encrypted key and the ROC of the sender. When Receiver B receives the carrier packet (block 808), the encrypted key is decrypted and uses the decrypted key as a 'provisional' master key to process the report packet. If the authentication of the report packet is successful, the provisional key is used as the regular master key to allow processing of the media packets (blocks 810, 812 and 814). Receiver B can then decode subsequent media packets send by the Media Source. When the next periodic Carrier packet is received by Receiver B (block 816), the encrypted key does not need to be processed because the ciphertext is identical to the previous carrier packet.

With EKT, in an example embodiment, each SRTP sender and receiver may generate distinct master keys. This feature alleviates security concerns associated with the re-use of keys by empowering the SRTP layer to create keys on demand. It will be noted, that the inputs of EKT may be the same as the inputs for SRTP with key-sharing: a single key encrypting key is provided to protect an entire SRTP session. EKT provides security, even in the absence of further out-of-band coordination of SSRCs, and even when SSRC values collide.

Thus, in an example embodiment, EKT uses encrypted key transport with implicit authentication. A strong cipher is used to ensure the confidentiality of the master keys as they are transported. The authenticity of the master keys is ensured by the base authentication check, which uses the plaintext form of that key. If the base authentication function and the cipher cannot be defeated by a particular attacker, then that attacker will be unable to defeat the implicit authentication. In an example embodiment, in order to avoid potential security issues, the SRTP authentication tag length used by the base authentication method may be ten octets or more.

With EKT, SRTP may gain the ability to synchronize the creation of cryptographic contexts across a plurality of devices in a single session. With EKT, signaling provides the SRTP options and the EKT key encrypting key, but it need not provide the key for each individual SRTP stream, which may result in better preserving the separation of signaling from the details of RTP. Signaling, when used with EKT, need not coordinate all RTP streams, nor predict in advance how many streams will be present, nor communicate RTP-level information of current session.

Furthermore, EKT may also be used in conjunction with a scalable group-key management system, such as, for example, the Group Domain of Interpretation (GDOI) protocol. Such a system may provide a secure entity authentication method and a way to revoke group membership.

Figure 9:
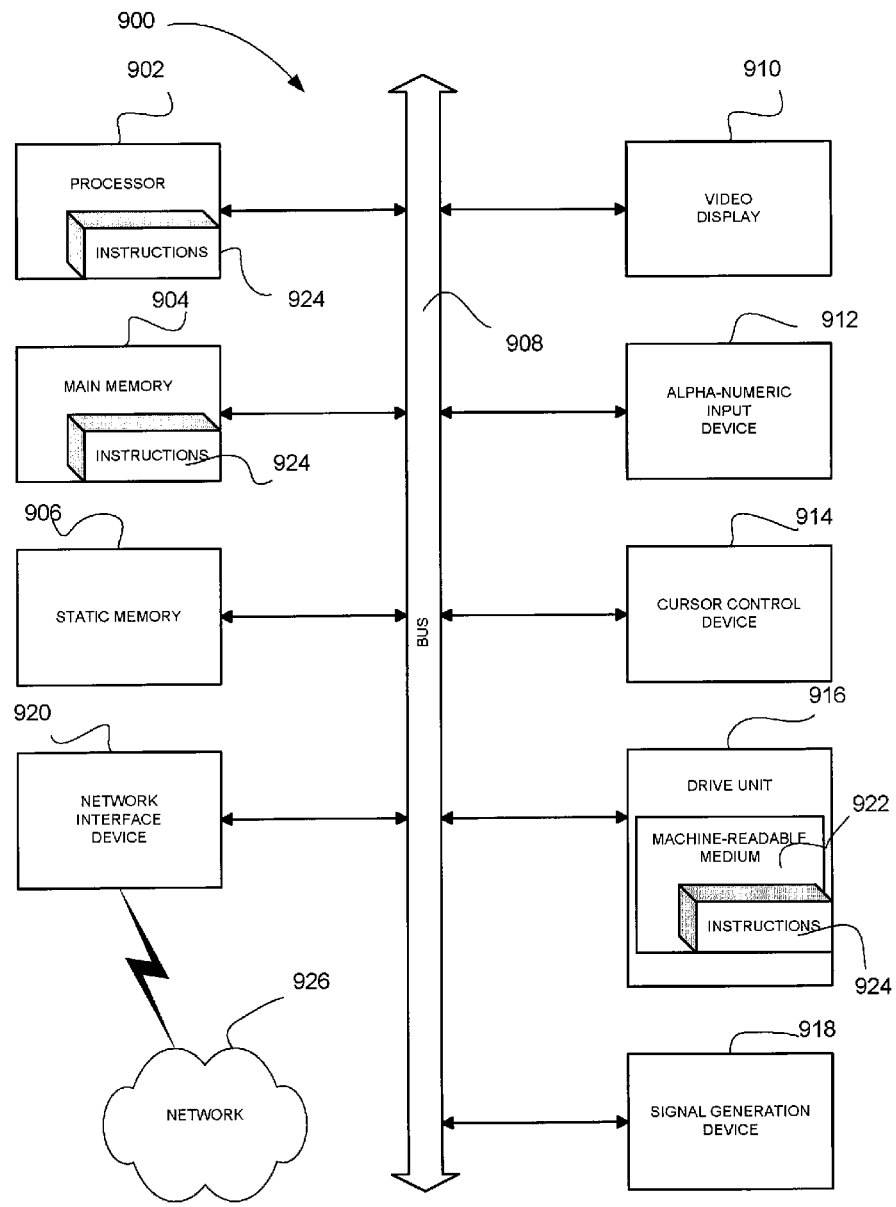
FIG. 9 illustrates a diagrammatic representation of an example machine in the form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voice mail system, a cellular telephone, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), optionally a user interface (UI) navigation device 914 (e.g., a mouse), optionally a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
a data communications module to send a data packet utilizing a data protocol, the data protocol being to accommodate communication of data, the data packet to be processed utilizing an encrypted key, the encrypted key being not included in the data packet; and
a carrier packet communications module to send, periodically, a carrier packet utilizing a control protocol, the control protocol being to control an associated communication session, the carrier packet comprising an authentication tag, the encrypted key, and a security parameter index, a decrypted version of the encrypted key being suitable for being authenticated using the authentication tag, the control protocol being separate from the data protocol, wherein the carrier packet is sent at once before the data sachet is sent by the data communications module, and the carrier packet is sent at least once after the data packet is sent by the data communications module, the encrypted key in the carrier packet that is sent before the data packet is sent being identical to the encrypted key in the carrier packet that is sent after the data packet is sent, and the security parameter index is configured to indicate a key encrypting key used to form the encrypted key.

2. The system of claim 1, further comprising a carrier packet generator to include the encrypted key into each packet associated with the control protocol.

3. The system of claim 1, wherein:
the encrypted key is to be obtained by a target device; and a decrypted key associated with the encrypted key is to be authenticated at the target device utilizing verification associated with the control protocol.

4. The system of claim 1, wherein the carrier packet comprises a rollover counter.

5. The system of claim 1, wherein the data protocol is a Real-time Transport Protocol (RIP) the control protocol is a Real-time Transport Control Protocol (RTCP).

6. A method comprising:
sending a data packet utilizing a data protocol, the data protocol being to accommodate communication of data, the data packet to be processed utilizing an encrypted key, the encrypted key being not included in the data packet; and
sending, periodically, a carrier packet utilizing a control protocol, the control protocol being to control an associated communication session the carrier packet comprising an authentication tag, the encrypted key, and a security parameter index, a decrypted version of the encrypted key being suitable for being authenticated using the authentication tag, the control protocol being separate from the data protocol, wherein the carrier packet is sent at least once before the data packet is sent by the data communications module and the carrier packet is sent at least once after the data packet is sent by the data communications module, the encrypted key in the carrier packet that is sent before the data packet is sent being identical to the encrypted key in the carrier packet that is sent after the data packet is sent, and the security parameter index is configured to indicate a key encrypting key used to form the encrypted key.

7. The method of claim 6, further comprising including the encrypted key into each packet associated with the control protocol.

8. The method of claim 6, further comprising:
obtaining the encrypted key at a target device;
decrypting the encrypted key to obtain a decrypted key; and
authenticating the decrypted key at the target device utilizing verification associated with the control protocol.

9. The method of claim 6, further comprising including a rollover counter into the carrier packet.

10. The method of claim 6, further comprising including an initial sequence number (ISN) into the carrier packet, wherein:
if the ISN value is non-zero, the ISN is to indicate a sequence number of an initial communications packet that is protected using the encrypted key; and
if the ISN value is zero, the ISN is to indicate that the initial communications packet that is protected using the first encrypted key either precedes or is concurrent with a last roll-over of a sequence number associated with the carrier packet.

11. A system to permit devices to participate in a communications session, the system comprising:
a message detector to receive via a data protocol, at a target device, a first communication from a source device, the first communication comprising a first message, the data protocol being to accommodate communication of data;
a carrier packet detector to:
monitor for a second communication from the source device, the second communication being sent periodically, utilizing a control protocol, from the source device and comprising an authentication tag, a first encrypted key, and a security parameter index, a decrypted version of the first encrypted key being suitable for being authenticated using the authentication tag, the first encrypted key to process the first message, the control protocol being to control an associated communication session, the control protocol being separate from the data protocol, wherein the second communication is sent at least once before the first communication is sent by the source device, and the second communication is sent at least once after the first communication is sent by the source device, the first encrypted key in the second communication that is sent before the first communication is sent being identical to the first encrypted key in the second communication that is sent after the first communication is sent, and the security parameter index is configured to indicate a key encrypting key used to form the first encrypted key, and
obtain the first encrypted key in response to the receiving of the first message; and
a message processing module to process the message at the target device, utilizing the first encrypted key.

12. The system of claim 11, further comprising:
a communications module to send, from the target device to the source device, a third communication comprising a second message; and
a carrier packet communications module to send, periodically, from the target device, a fourth communication comprising a second encrypted key to permit the processing of the second message by the source device.

13. The system of claim 12, wherein:
the fourth communication is associated with a control protocol; and
the third communication is associated with a data protocol.

14. The system of claim 11, further comprising:
a decrypting module to decrypt the first encrypted key; and
an authentication module to authenticate the decrypted first encrypted key utilizing a base protocol verification.

15. The system of claim 14, wherein the carrier packet detector is to store the decrypted first encrypted key at the target device to permit processing further messages from the source device.

16. The system of claim 11, wherein the second communication comprises a rollover counter associated with the first communication.

17. The system of claim 11, wherein the second communication comprises an initial sequence number (ISN) associated with the source device, wherein:
if the ISN value is non-zero, the ISN is to indicate a sequence number of an initial communications packet that is protected using the first encrypted key; and
if the ISN value is zero, the ISN is to indicate that the initial communications packet that is protected using the first encrypted key either precedes or is concurrent with a last roll-over of a sequence number associated with the second communication.

18. The system of claim 11, wherein the first encrypted key is encrypted under a long term key encrypting key (KEK).

19. The system of claim 11, wherein the carrier packet detector is to receive the second communication comprising the first encrypted key only in response to the first message.

20. A method to permit devices to participate in a real time communications session, the method comprising:
receiving via a data protocol, at a target device, a first communication from a source device, the first communication comprising a first message, the data protocol being to accommodate communication of data;
monitoring, at a target device, for a second communication from a source device, the second communication comprising an authentication tag, a first encrypted key, and a security parameter index, a decrypted version of the first encrypted key being suitable for being authenticated using the authentication tag, the first encrypted key to process the first message, the second communication utilizing a control protocol, the control protocol being to control an associated communication session, the control protocol being separate from the data protocol, wherein the second communication is sent at least once before the first communication is sent by the source device, and the second communication is sent at least once after the first communication is sent by the source device, the first encrypted key in the second communication that is sent before the first communication is sent being identical to the first encrypted key in the second communication that is sent after the first communication is sent, and the security parameter index is configured to indicate a key encrypting key used to form the first encrypted key;

obtaining the first encrypted key from the second communication in response to the receiving of the first communication comprising; and processing the message at the target device, utilizing the first encrypted key.

21. The method of claim 20, wherein the processing of the message comprises:

decrypting the first encrypted key at the target device; and authenticating the decrypted first encrypted key utilizing a base protocol verification.

22. The method of claim 21, wherein a base protocol utilized for the base protocol verification is a base security protocol that provides authenticated encryption.

23. The method of claim 22, wherein the base protocol is SRTP and the second communication is an SRTP sender report.

24. The method of claim 22, wherein the receiving of the second communication comprises receiving a rollover counter associated with the first communication.

25. The method of claim 20, further comprising discarding the first encrypted key subsequent to the processing of the message.

26. The method of claim 20, further comprising:

sending, from the target device to the source device, a third communication comprising a second message;

sending, from the target device, a fourth communication comprising a second encrypted key to permit the processing of the second message by the source device.

27. The method of claim 26, wherein the sending of the fourth communication is performed periodically.

28. The method of claim 26, wherein the second encrypted key is encrypted utilizing a key encrypting key, the key encrypting key being shared among the source device and the target device.

29. The method of claim 26, wherein the sending of the fourth communication comprises including a security parameter index into the fourth communication.

30. The method of claim 26, wherein the sending of the fourth communication comprises including synchronization source ID (SSRC) value into the fourth communication.

31. The method of claim 26, wherein the sending of the fourth communication comprises including into the fourth communication an identifier to indicate a crypto-suite in use.

32. The method of claim 20, further comprising storing the first encrypted key at the target device to permit processing further media messages from the source device.

33. The method of claim 20, further comprising discarding the first encrypted key at the target device in response to the processing of the first message.

34. The method of claim 20, wherein the receiving of the second communication is only in response to the receiving of the first communication comprising the first message.

35. A machine-readable non-transitory storage medium having stored thereon data representing sets of instructions which, when executed by a machine, cause the machine to:

receive via a data protocol, at a target device, a first communication from a source device, the first communication comprising a first message, the data protocol being to accommodate communication of data;

receive, at a target device, a second communication from a source device, the second communication comprising an authentication tag, a first encrypted key to decode the first message, and a security parameter index, a decrypted version of the first encrypted key being suitable for being authenticated using the authentication tag, the second communication utilizing a control protocol, the control protocol being to control an associated communication session, the control protocol being separate from the data protocol, wherein the second communication is sent at least once before the first communication is sent by the source device, and the second communication is sent at least once after the first communication is sent by the source device, the encrypted key in the second communication that is sent before the first communication is sent being identical to the encrypted key in the second communication that is sent after the first communication is sent, and the security parameter index is configured to indicate a key encrypting key used to form the first encrypted key; and decode at the target device, the message, utilizing the first encrypted key.

36. A system to transport encrypted keys, the system comprising:

means for receiving via a data protocol, at a target device, a first communication from a source device, the first communication comprising a first message, the data protocol being to accommodate communication of data;

means for receiving, at a target device, a second communication from a source device utilizing a control protocol, the second communication comprising an authentication tag, a first encrypted key to decode the first message, and a security parameter index, a decrypted version of the first encrypted key being suitable for being authenticated using the authentication tag, the control protocol being to control an associated communication session, the control protocol being separate from the data protocol, wherein the second communication is sent a least once before the first communication is sent by the source device, and the second communication is sent at least once after the first communication is sent by the source device, the encrypted key in the second communication that is sent before the first communication is sent being identical to the encrypted key in the second communication that is sent after the first communication is sent, and the security parameter index is configured to indicate a key encrypting key used to form the encrypted key; and means for processing the message at the target device, utilizing the first encrypted key.

37. An apparatus to receive secure real time communications, the apparatus comprising:

a message detector to receive via a data protocol a secure message from a source device, the data protocol being to accommodate communication of data a carrier packet detector to:

monitor for a communication from the source device, the communication comprising an authentication tag, an encrypted key to process the message, and a security parameter index, a decrypted version of the encrypted key being suitable for being authenticated using the authentication tag, the communication utilizing a control protocol, the control protocol being to control an associated communication session, the control protocol being separate from the data protocol, wherein the communication is sent at least once before the secure message is sent by the source device, and the communication is sent at least once after the secure message is sent by the source device, the encrypted key in the communication that is sent before the secure message is sent being identical to the encrypted key in the communication that is sent after the secure message is sent, and the security parameter index is configured to indicate a key encrypting key used to form the encrypted key, and obtain the encrypted key in response to the receiving of the secure message;

a decrypting module to decrypt the encrypted key;

an authentication module to authenticate the decrypted key utilizing abuse protocol verification using the authentication tag; and a message processing module to process the secure message, utilizing the obtained encrypted key.

* * * * *

UNITED STATES PATENT AND TRADEMARK OFFICE
CERTIFICATE OF CORRECTION

PATENT NO.        : 8,503,681 B1  
APPLICATION NO.   : 11/463254  
DATED             : August 6, 2013  
INVENTOR(S)       : McGrew et al.

Page 1 of 1

It is certified that error appears in the above-identified patent and that said Letters Patent is hereby corrected as shown below:

In the Claims

In column 12, line 54, in Claim 1, before "once", insert --least--, therefor

In column 12, line 54, in Claim 1, delete "sachet" and insert --packet--, therefor In column 13, line 7, in Claim 5, delete "(RIP)" and insert --(RTP)--, therefor In column 13, line 24, in Claim 6, delete "module" and insert --module,--, therefor In column 16, line 50, in Claim 36, delete "a" and insert --at--, therefor In column 16, line 66, in Claim 37, delete "data" and insert --data;--, therefor In column 17, line 24, in Claim 37, delete "abuse" and insert --a base--, therefor Signed and Sealed this  
Twenty-fourth Day of December, 2013

Margaret A. Focarino  
*Commissioner for Patents of the United States Patent and Trademark Office*